United States Patent [19]

Taylor

[11] Patent Number: 4,980,880

[45] Date of Patent: Dec. 25, 1990

[54] METHOD AND APPARATUS FOR SIMULTANEOUSLY READING BOTH SIDES OF AN OPTICAL STORAGE DISK

[75] Inventor: Wilhelm Taylor, Colorado Springs, Colo.

[73] Assignee: Laser Magnetic Storage International Company, Colorado Springs, Colo.

[21] Appl. No.: 432,930

[22] Filed: Nov. 6, 1989

[51] Int. Cl.$^5$ ............................................. G11B 17/08
[52] U.S. Cl. .................................... 369/199; 369/195
[58] Field of Search ............................. 369/199, 195

[56] References Cited

U.S. PATENT DOCUMENTS

| | | | |
|---|---|---|---|
| 3,079,839 | 3/1963 | Lohner et al. | 88/24 |
| 4,097,895 | 6/1978 | Spong | 358/128 |
| 4,125,324 | 11/1978 | Spence-Bate | 355/23 |
| 4,189,233 | 2/1980 | Hurt et al. | 356/5 |
| 4,271,489 | 6/1981 | Siryj et al. | 369/38 |
| 4,286,790 | 9/1981 | Siryj et al. | 369/36 |
| 4,300,226 | 11/1981 | Barnette et al. | 369/45 |
| 4,337,532 | 6/1982 | Oprandi et al. | 369/45 |
| 4,387,452 | 6/1983 | Bricot et al. | 369/32 |
| 4,538,882 | 9/1985 | Tanaka et al. | 350/255 |
| 4,687,310 | 8/1987 | Cuvillier | 354/115 |
| 4,694,442 | 9/1987 | Gijzen et al. | 369/44 |
| 4,748,456 | 5/1988 | Luoma et al. | 346/107 |
| 4,845,356 | 7/1989 | Baker | 250/225 |

FOREIGN PATENT DOCUMENTS 0322019 12/1988 European Pat. Off. .

*Primary Examiner*—Stuart S. Levy
*Assistant Examiner*—Kenneth B. Wells
*Attorney, Agent, or Firm*—Sheridan, Ross & McIntosh

[57] ABSTRACT

An optical storage disk reading apparatus (10) allows the simultaneous reading of both sides of an optical storage disk (44). An upper base plate (12) and a lower base plate (14) pivot about hinges (22-28) through the action of lead screws (30-32). The lead screws (30-32) are turned by separate stepper motors (38-39) which drive follower nuts (34-36) therealong. The follower nuts (34-36) are interconnected to the baseplates (12-14) by yokes (40-42). As the lead screws (30-32) drive the follower nuts (34-36), the yokes (40-42) pivotally move the base plates (12-14) about the hinges (22-28). A cartridge (46) containing the storage disk (44) is loaded into the apparatus (10) along receiving channels (48-50). The channels (48-50) hold the cartridge (46) from movement while the disk (44) is free to move therein with the lower base plate (14) through an interconnecting drive spindle (20). The disk (44) is thus positioned parallel to and a fixed distance from the lower base plate (14) equal to the focal distance of an optical reader (54) thereon. The upper base plate (12) is positioned parallel to the lower base plate (14) and a variable distance from the disk (44). An optical reader (52) on the upper base plate (12) provides data to the stepper motor (38) associated therewith to move the upper plate (12) to the proper focal distance from the optical reader (52). When the upper plate (12) moves, the lower plate (14) also moves to keep a parallel relationship therebetween.

26 Claims, 5 Drawing Sheets

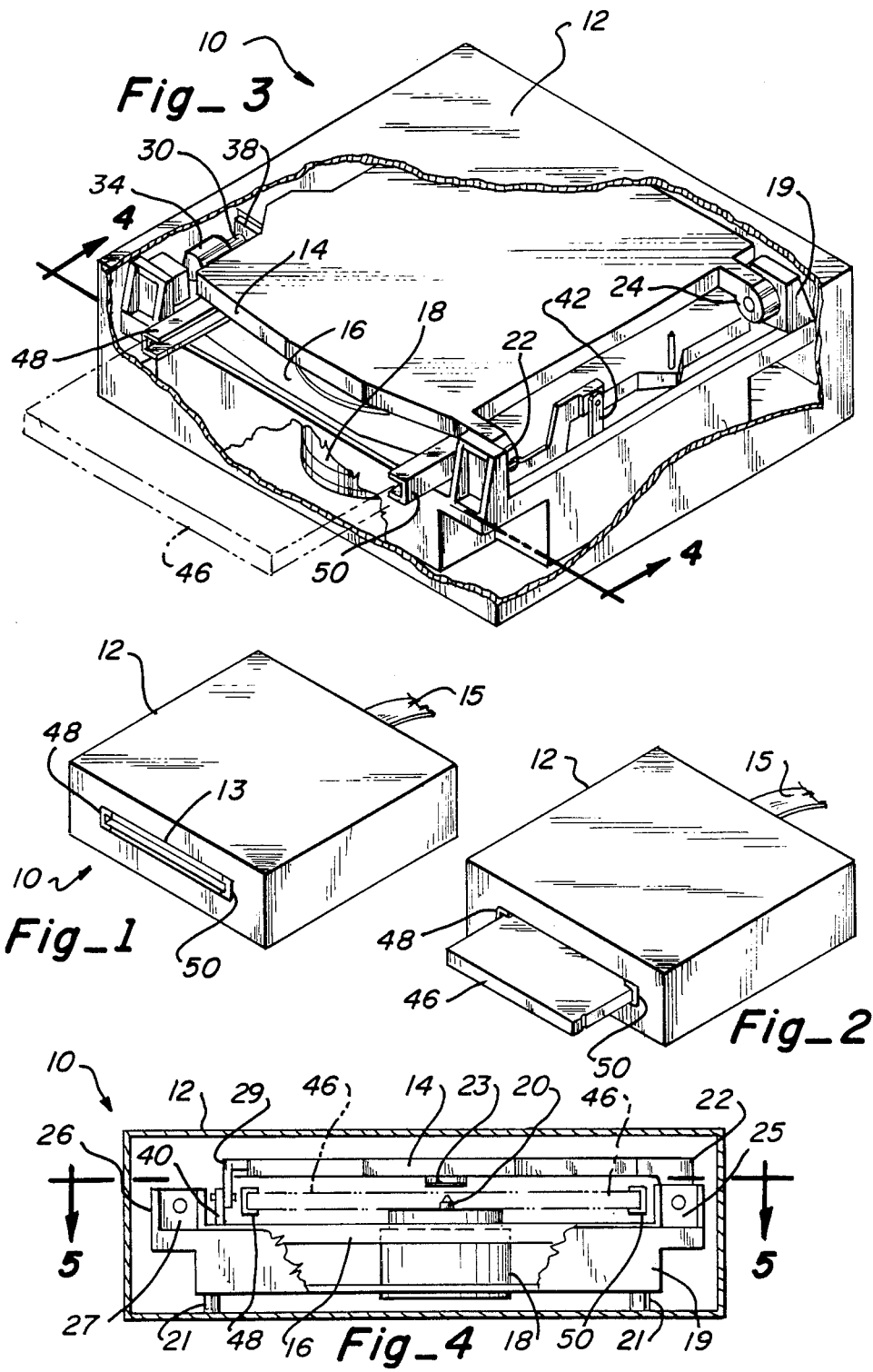

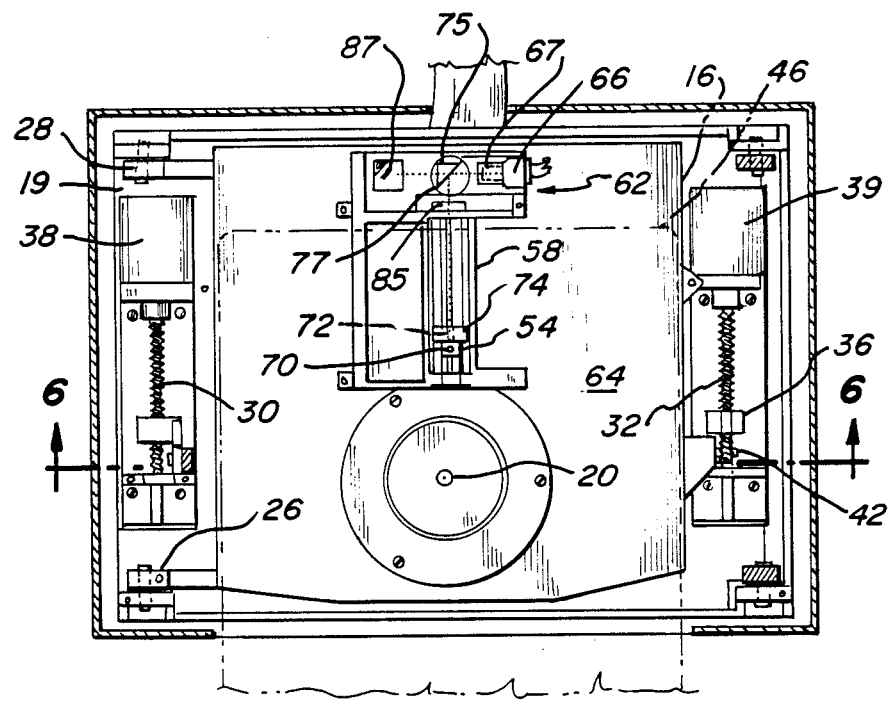
Fig_5
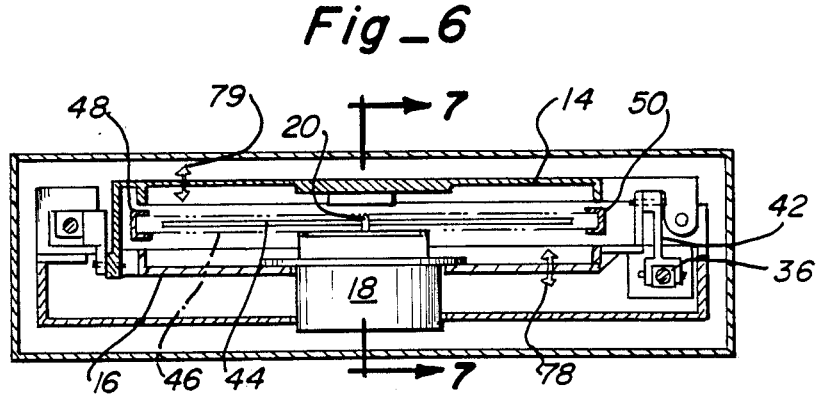
Fig_6

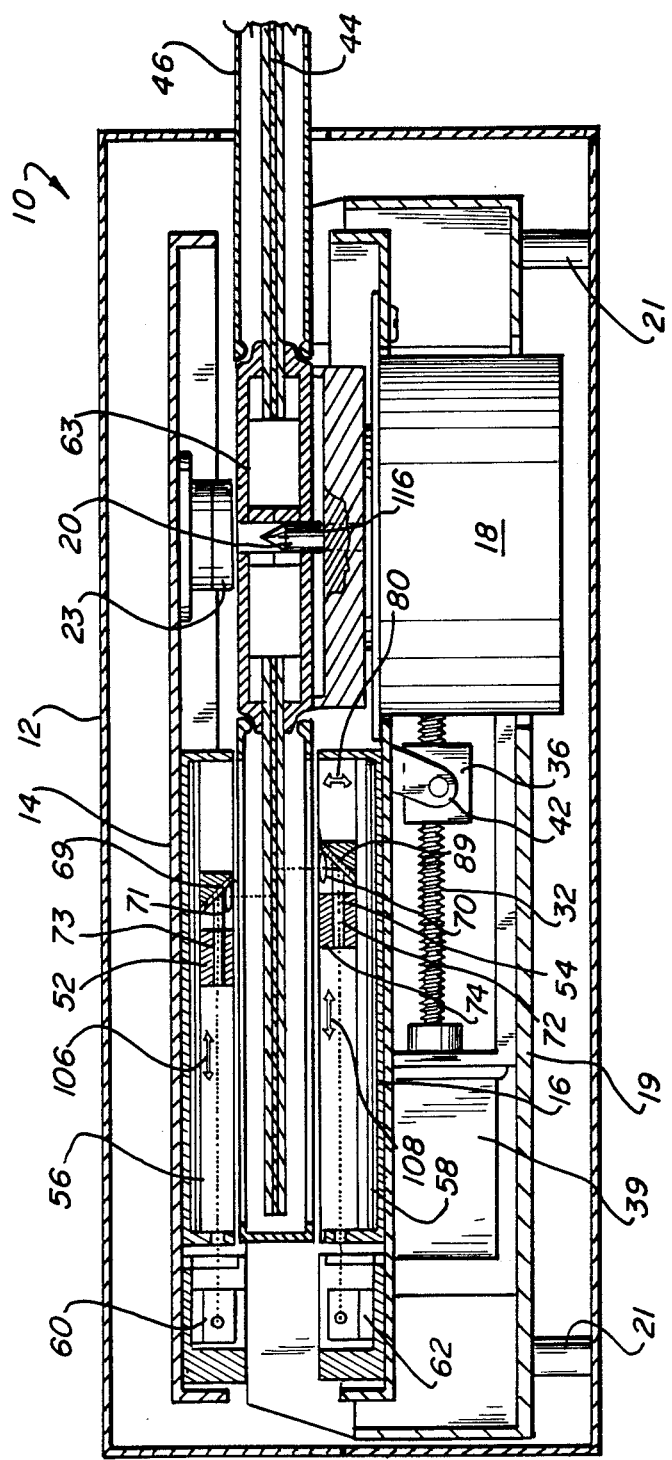
Fig_7

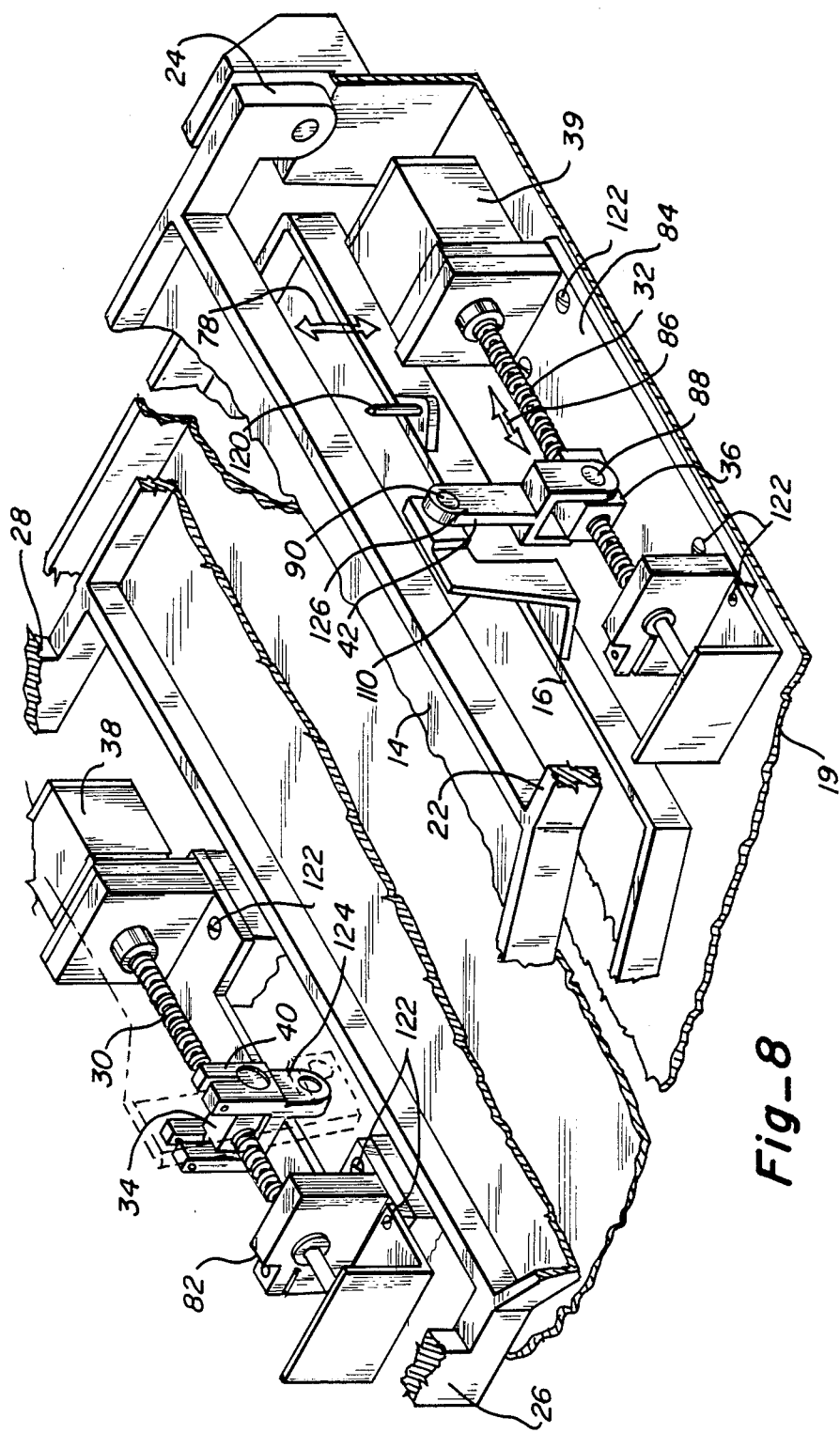
Fig_8

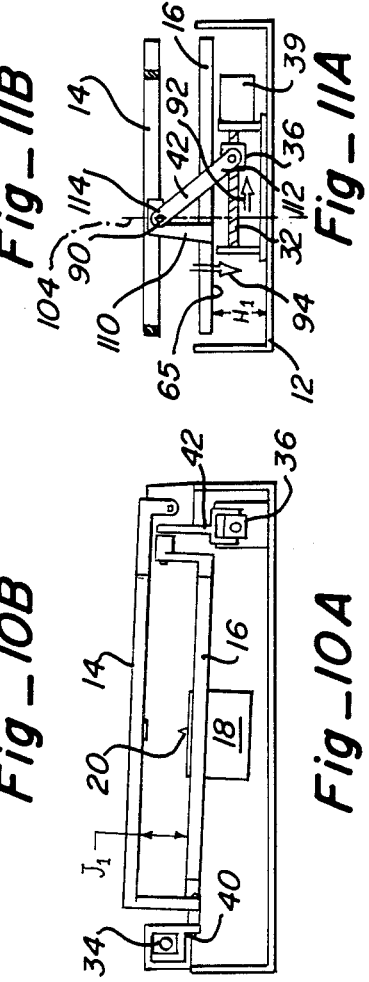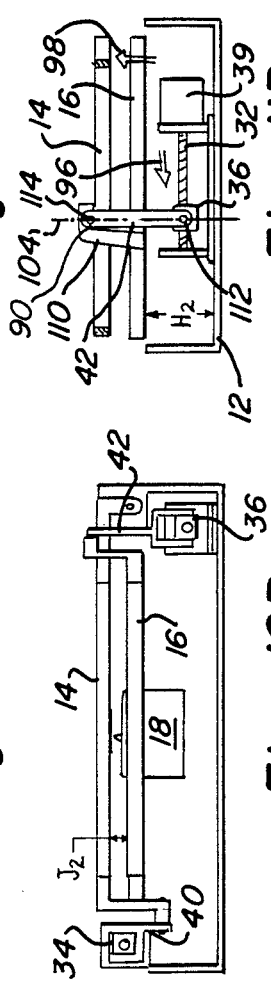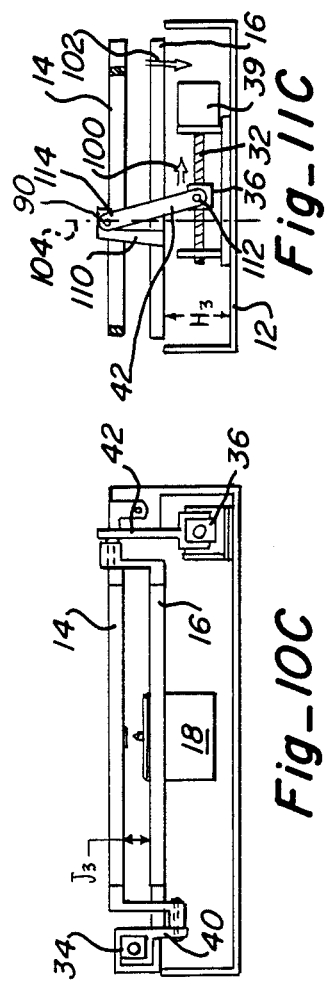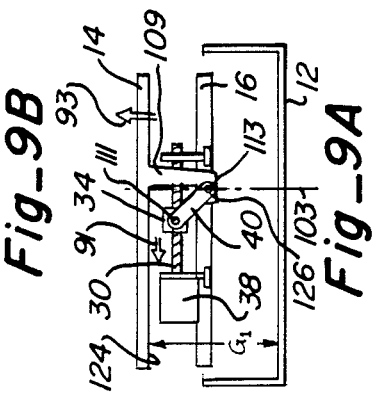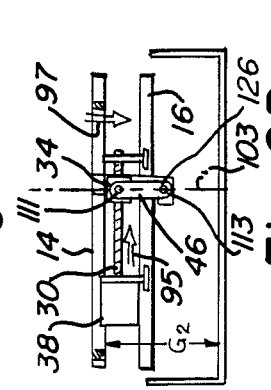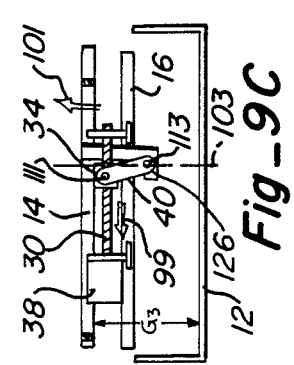

METHOD AND APPARATUS FOR SIMULTANEOUSLY READING BOTH SIDES OF AN OPTICAL STORAGE DISK

TECHNICAL FIELD OF THE INVENTION

This invention relates in general to optical storage disk devices, and in particular to a method and apparatus for simultaneously reading both sides of an optical storage disk

BACKGROUND OF THE INVENTION

The use of optical storage disks for the recording of data has become a frequently used option. Data can be stored on a top and bottom side of the optical storage disk to increase the storage capacity of the disk. However, unlike magnetic storage disk readers, optical storage disk readers generally do not allow simultaneous reading of both sides of an optical storage disk. In those few devices allowing both sides of an optical disk to be read simultaneously, the device is generally a fixed media device capable of using only fixed disks.

In order to increase on-line data capacity and shorten the transfer time of data stored on an optical storage disk, it is desirable to store the data on both sides of a single disk (including the use of such methods as the "interleaving" of data). Thus, as optical readers simultaneously pass over both sides of the disk, the information stored thereon may be read in such a fashion as to allow twice the amount of data to be retrieved in the same time as normally required to read one side.

With optical storage disk readers, it is essential to keep the beam of light used to read and/or imprint the disk perpendicular to the surface thereof. The spot from the beam on the disk degrades (for optical reasons) as the beam varies from a perfectly perpendicular orientation. Thus, in a double side reader, it is necessary to provide a device that can maintain the vertical relationship between both sides of an optical disk and the optical readers associated therewith.

One attempt to utilize both sides of an optical storage disk is disclosed in U.S. Pat. No. 4,387,452, to Bricot, et al., June 7, 1983. The Bricot patent discloses the use of optical readers/recorders capable of simultaneously reading/recording on oppositely facing sides of two separate optical storage disks. The Bricot invention requires the use of an intricate optical device capable of adjustably focusing on the surface of the disk. A plurality of optical storage disks are stacked with the optical reading/recording devices between the disks for reading of the opposite faces The Bricot method requires the use of two separate disks for the utilization of the space on two sides of a disk. Therefore, it is necessary to record the data on sets of disks rather than on a single disk.

Another device designed to attempt to read both sides of an optical storage disk is disclosed in U.S. Pat. No. 4,271,489, to Siryj et al., June 2, 1981, and U.S. Pat. No. 4,286,790, to Siryj et al., Sep. 1, 1981. The Siryj devices use optics such as are disclosed in U.S. Pat. No. 4,097,895, to Spong, June 27, 1978, and U.S. Pat. No. 4,300,226, to Barnette et al., Nov. 10, 1981. The optics in Barnette and Spong are capable of focusing on the surface of a disk which has discontinuities thereon from varying thicknesses of the surface coating material in the range of 3 mils (0.076 mm). Spong and Barnette do not take into consideration and are not capable of adjusting to disks having a thickness that varies beyond the minute surface discontinuities.

Unfortunately, optical storage disks can typically vary in thickness from approximately 2.75 mm to approximately 3.50 mm. These thickness variations are due to the disk construction by various manufacturers and the coatings which are applied thereto for the recording of data. Thus, in order to properly read both sides of a single disk which varies in thickness, it is necessary to have optical devices capable of adjustably focusing on each surface while maintaining a perpendicular relationship to both sides. Heretofore, it has been too difficult and/or expensive to provide a device capable of sufficient focusing adjustment to compensate for the varying thicknesses of optical storage disks. Thus, there is a need for a method and apparatus capable of simultaneously focusing on both sides of a single optical storage disk of varying thickness for simultaneous reading of the two sides.

SUMMARY OF THE INVENTION

The present invention disclosed herein describes a method and apparatus for simultaneously reading both sides of an optical storage disk which eliminates or substantially reduces problems associated with prior optical storage disk reading devices. The present invention allows the simultaneous reading of both sides of disks that vary in thickness without the need for relatively expensive optical mechanisms.

In accordance with one aspect of the invention, an optical storage disk encased within a cartridge is inserted into an optical reading device. Channels are provided for holding the cartridge in a fixed position relative to the storage disk by the case containing the optical reading device. A lower base plate including a spindle and a drive motor for rotating the disk is moved into position so that the optical disk is fixed parallel to and a known distance from the lower base plate. Simultaneously, an upper base plate is positioned parallel to the lower base plate and at a predetermined distance therefrom corresponding to the proper focal distance to the thinnest optical storage disk available. From this point, optics associated with the upper base plate provide data that allow the upper base plate to move to the proper focal distance from the disk. While the upper plate moves, the lower plate also moves to maintain the parallel orientation between the lower base plate, the optical storage disk and the upper base plate.

Once the base plates have moved to the proper position for focusing of the upper optics (the lower optics are in focus based on the fixed distance between the lower optics and the lower surface of the optical storage disk), the upper and lower optical reading devices are moved radially with respect to the disk along slides to allow reading thereof.

The upper and lower base plates are positioned by being raised or lowered as they pivot about hinges. Each base plate is hinged on one edge to the optical reading device case in opposite arrangements, and each is attached at a second edge to a yoke which is, in turn, interconnected through a follower nut to a lead screw. As the lead screw is turned by a motor, the follower nut travels therealong causing the yoke to pivot the base plate up and down about the hinges.

The optics provided for reading the upper and lower sides of the disk are of a type having a fixed focal length and are supported by a pair of parallel flexures. The flexures are surrounded by an electrical coil which may be charged to attract the parallel flexures, causing the optics to move toward or away from the optical disk surface. Due to the adjustability of the parallel base plates, it is possible to position the optics at a distance equal to their focal length from each surface of the optical storage disk. This allows the optics to be positioned in the center of their adjustable travel and movement thereof is only required to compensate for disk surface incongruities rather than for thickness variations.

It is a technical advantage of the present invention that both sides of an optical storage disk may be read simultaneously allowing on-line data to be doubled and data transfer time to be cut in half. It is a further technical advantage of the present invention that fixed focal length optics may be used while maintaining the ability to focus on the surface of the optical disk. It is a still further technical advantage of the present invention that a variety of optical disks may read on an interchangeable basis.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 is an isometric view of an optical disk reader constructed in accordance with the preferred embodiment of the present invention;

FIG. 2 is an isometric view of an optical disk reader of the present invention with an optical disk cartridge inserted therein;

FIG. 3 is a partially cut away isometric view of the optical disk reader and optical disk cartridge of the present invention;

FIG. 4 is a sectional view along the line 4—4 of FIG. 3;

FIG. 5 is a top plan view along the line 5—5 of FIG. 4;

FIG. 6 is a sectional view taken along the line 6—6 of FIG. 5;

FIG. 7 is a sectional view taken along the line 7—7 of FIG. 6;

FIG. 8 is an isometric view of both lead screw assemblies of the present invention; and FIGS. 9, 10 and 11 are representations of the interrelationship between the lead screws and the yokes in various operating positions.

DETAILED DESCRIPTION OF THE INVENTION

In FIGS. 1-12, like items are identified by like and corresponding numerals for ease of reference. Referring first to FIG. 1, an isometric view of an optical storage disk reading apparatus constructed in accordance with the preferred embodiment of the present invention is generally identified by the reference numeral 10. The reading apparatus 10 comprises a storage case 12 for containing the devices to simultaneously read both sides of an optical storage disk 44 (See FIG. 7), as will be subsequently described in greater detail. The case 12 has an opening slot 13 for receiving an optical storage disk cartridge 46 within receiving channels 48 and 50. A hinged door (not shown) may be provided for closing the opening slot 13 when the apparatus 10 is not in use. A power and control strap 15 extends from the case 12 for connection to other appropriate devices, not shown.

Referring to FIG. 2, the apparatus 10 is shown with an optical storage disk cartridge 46 inserted into the case 12. As can be appreciated, the cartridge 46 is fixed in position relative to the case 12 by the receiving channels 48 and 50. Thus, it is possible to reposition the optical storage disk 44 within the cartridge 46 without moving the cartridge 46, as will be subsequently described in greater detail.

Referring to FIG. 3, a more detailed, partially cutaway isometric view of the apparatus 10 is shown. Within the storage case 12 is positioned an upper base plate 14 and a lower base plate 16. The upper and lower base plates 14–16 are constructed essentially the same except that the lower base plate 16 is provided with a disk drive motor 18 and a disk drive spindle 20 (FIG. 4).

The upper and lower base plates 14–16 are each provided with a pair of hinges 22–24 and 26–28, respectively (hinges 26 and 28 shown in FIG. 5). The hinges 22–28 pivotally connect the upper and lower base plates 14–16 to a frame 19 within the case 12. Each base plate 14–16 is matched with a lead screw 30 or 32, respectively (lead screw 32 shown in FIG. 5). Lead screw 30 is provided with a follower nut 34 and lead screw 32 is provided with a follower nut 36, each of which are driven by separate stepper motors 38 and 39 (follower nut 36 and motor 39 shown in FIG. 5). The follower nuts 34–36 are connected to their respective base plates 14–16 by yokes 40 and 42.

As the stepper motors 38 and 39 turn the lead screws 30–32, the follower nuts 34–36 travel therealong causing the appropriate yoke 40–42 to raise or lower the attached base plates 14–16. Thus when the cartridge 46 is inserted into the reading apparatus 10 along the receiving channels 48 and 50, the upper and lower base plates 14–16 are pivotally adjusted by their respective motors 38 and 39. The base plates 14–16 are pivotally adjusted until the disk 44 is the proper focal distance from optics associated with each base plate 14–16, as will be subsequently described in greater detail. The motors 38 and 39 are geared to allow manual rotation of the lead screws 30–32 should the need arise such as during a loss of power. The motors 38 and 39 are also designed to remain engaged to act as a brake to prevent unwanted movement of the base plates 14–16 once they are properly positioned.

Referring to FIG. 4, a sectional view is shown of the apparatus 10 along the line 4–4 of FIG. 3. The frame 19 is separated from the case 12 by shock mounts 21. The drive motor 18 depends downwardly from the lower base plate 16. The spindle 20 protrudes through the cartridge 46 into contact with the disk hub means 63 (see FIG. 7) for rotational drive thereof. The hub means 63 may be held by any appropriate means, such as magnetically, and torque may be applied thereto by a pin, not shown. A protrusion 23 depends downwardly from the upper base plate 14 opposite the spindle 20 to prevent damage to optics associated with each plate 14–16 by the disk 44. If the apparatus 10 were bumped hard enough to cause the disk 44 to momentarily move off the spindle 20, the protrusion 23 would prevent excessive wobble of the disk 44 by coming into contact with a hub means 63 (FIG. 7) fixed thereto.

The hinge 22 is pinned to the frame 19 through a bracket 25 while the hinge 26 is similarly pinned through a bracket 27. The yoke 40 is pivotally attached to the upper base plate 14 through an extension bracket 29, as will be subsequently described in greater detail. The receiving channels 48 and 50 are secured to the frame 19 by means, not shown, to fix their position relative thereto.

Referring to FIG. 5, a top plan view of the apparatus 10 is shown with the upper base plate 14 removed for the sake of clarity. Fixed to an upper surface 64 of the lower base plate 16 is an optical reader 54, guide rails 58 and an optical transmitter receiver assembly generally indicated by the reference numeral 62. The guide rails 58 are constructed and arranged to allow the optical reader 54 to move radially with respect to the optical storage disk 44. The reader 54 will move radially along the rails 58 in response to a signal from a controller (not shown) to read all the data on the surface of the disk 44.

The optical transmitter/receiver 62 is positioned at an end of the guide rails 58 opposite the spindle 20 to allow an infra-red laser 66 to direct a laser beam (not shown) at the optical reader 54. The laser beam is collimated by appropriate lenses such as a lens 67 and passed to a beam splitter 75. The beam splitter 75 has a polarizing screen 77 which deflects the laser beam toward the reader 54. Before reaching the reader 54, the laser beam passes through a quarter wave plate 85 which converts the linearly polarized beam into a circularly polarized beam for use by the optical reader 54, as will be subsequently described in greater detail.

Upon returning from the disk 44 and the reader 54, the laser beam again passes through the wave plate 85 and is reconverted into a linearly polarized beam. Now, however, upon striking the beam splitter 75 and the polarizing screen 77, the laser beam is passed through the screen 77 due to the two quarter wave changes from the plate 85 rather than deflected therefrom. After passing through the beam splitter 75, the laser beam is deflected through a torroidal lens (not shown) and into a detector means 87. The detector means 87, which may include, for example, a quad detector as is well known in the art, determines whether the optical reader 54 is correctly focused on the disk 44. Since the disk 44 is fixed at the proper focal length from the optical reader 54, the detector means 87 will only provide data to the optical reader 54 to make focusing adjustments, as will be subsequently described, to compensate for surface irregularities on the disk 44. The detector means 87 also includes a photodetector, for example, such as is disclosed in U.S. Pat. No. 4,097,895, to Spong, June 27, 1978, capable of interpreting the data on the disk 44.

The optical reader 54 is provided with mirror means 89 (FIG. 7) to deflect the laser beam from the laser 66 into an optical lens 70. The lens 70 focuses the deflected laser beam onto the reading surface of the optical storage disk 44. The reader 54 moves generally perpendicular relative to upper surface 64 of the lower plate 16 about a pair of parallel flexures 72, only one of which is shown. The parallel flexures 72 are encircled by a wire coil 74 which may magnetically attract the flexures 72 to pull the lens 70 closer to or farther away from the optical storage disk 44. Thus, it is possible to refocus the lens 70 in response to any surface irregularities that may be present on the optical disk 44. As previously indicated above, the optical storage disk 44, when placed upon the spindle 20, is positioned parallel to and at a fixed distance from the lower base plate 16. The fixed distance is based upon the focal distance of the lens 70 from the center position of its perpendicular travel about the flexures 72. By positioning the optical disk 44 at this distance from the lens 70, the full refocusing range of the lens 70 is available to compensate for any surface irregularities.

Fixed to the frame 19 on opposite sides of the lower base plate 16 are the lead screws 30 and 32. The lead screw 32 provides pivotal raising and lowering motion for the lower base plate 16, and the lead screw 30 provides the same motion for the upper base plate 14. The lead screw 32 is driven by the stepper motor 39 and has a follower nut 36 which travels therealong. The lower base plate 16 is connected to the follower nut 36 by the yoke 42. As shown in FIG. 5, the lead screws 3032 are each driven independently by separate stepper motors 38 and 39 due to different dimensions of the yokes 40-42 which are necessitated by the positioning of the base plates 14 and 16 relative thereto. As previously stated above, the stepper motors 38 and 39 are continuously driven to act as brakes to prevent unwanted movement of the plates 14-16 once they are properly positioned.

Referring to FIG. 6, a sectional view taken along line 6—6 of FIG. 5, is illustrated. The relationship between the optical storage disk 44, the lower base plate 16 and the upper base plate 14 may be seen more clearly. As previously stated above, the optical storage disk 44 is fixed parallel to and a known distance from the lower base plate 16 through the spindle 20. Thus, it can be seen that although the lower base plate 16 may pivotally move as indicated by an arrow 78, about the hinges 26 and 28 by the action of the yoke 42 and follower nut 36, the relationship between the lower base plate 16 and the disk 44 remains fixed, even though the cartridge 46 is fixed in position by the channels 48 and 50. Therefore, there must be sufficient space between the cartridge 46 and the disk 44 to allow the disk 44 to change its position relative thereto as the lower base plate 16 moves.

While the lower base plate moves along arrow 78, the upper base plate 14 pivotally moves as indicated by an arrow 79. As can be appreciated, the lower base plate 16 will move in one direction along arrow 78 and the upper base plate 14 will move in an opposite direction along arrow 79 to maintain the parallel relationship therebetween, as will be subsequently described in greater detail.

Referring to FIG. 7, a sectional view taken along the line 7—7 of FIG. 6 is shown. The optical storage disk 44 contained within the cartridge 46 is slidably inserted into the reading apparatus 10 along the receiving channels 48 and 50. The disk 44 may be of varying thicknesses, for example, from 2.75 mm to 3.50 mm. Optical readers 52 and 54 are slidably positioned along guide rails 56 and 58, respectively. Within each optical reader 52-54, there is a plurality of optical devices which are well known in the art to enable the optical storage disk 44 to be read, as will be subsequently described in greater detail. Fixed to the base plates 14-16 are optical transmitter/receivers 60 and 62, respectively, which are fixed in position relative to the optical readers 52-54. As the disk 44 is rotated about a central vertical axis, the readers 52-54 slide within the guide rails 56-58, traversing a radius of the optical storage disk 44 and reading the data thereon.

When the cartridge 46 containing the optical storage disk 44 is inserted into the receiving channels 48-50, each base plate 14-16 initiates an engagement sequence. During the engagement sequence, the lower base plate 16 is positioned to insert the spindle 20 into a receiving hole 116 in a central disk hub means 63 which securely holds the optical storage disk 44. The central hub means 63 is interconnected to the disk by means not shown and rests upon drive means associated with the lower base plate 16, as will be subsequently described in greater detail. The storage disk 44 is thus positioned parallel to and a fixed distance from an upper surface 64 of the lower base plate 16. Simultaneously, the upper base plate 14 is lowered to a predesignated position which is determined by the thickness of the thinnest storage disk available. Thus, the optical reader 54 for the lower base plate 16 is positioned at the proper focal length from the disk 44, but the optical reader 52 for the upper base plate 14 is likely not yet properly positioned. The sequence for properly positioning the upper base plate 14 to place the optical reader 52 at the proper focal distance from the disk 44 will be subsequently described in greater detail.

The distance between the disk 44 and the lower base plate 16 is predetermined and set equal to the focal length of the lens 70 in the optical reader 54 when the lens 70 is in the center of its travel (or focusing range) about flexures 72. In order to compensate for variations in the surface of the disk 44 as well as any possible wobble thereof, the lens 70 and the mirror means 89 may move vertically up or down relative to the disk 44 as indicated by an arrow 80 due to the coil 74. The coil 74 acts as a magnet to attract the metallic material of the flexures 72 thus pulling or pushing the lens 70 and the mirror means 89 farther from or closer to the disk 44 along its vertical travel 80 due to any slight distance variations therebetween.

The distance between the disk 44 and the upper base plate 14 is also determined by a focal length of lens 71 in mirror means 69 of the optical reader 52. In an important aspect of the present invention, unlike the lower plate 16 the distance from the lens 71 to the disk 44, is not preset or fixed due to a need to compensate for the various thicknesses available for optical storage disks. Thus, as previously described above, the upper base plate 14 is positioned during the engagement sequence parallel to and at a distance from the disk 44 equal to the focal length of the lens 71 to the surface of the thinnest available disk (i.e., at the closest distance therefrom). Subsequently, the optical transmitter/receiver 60 provides a signal to the stepper motor 39 (in the same fashion as previously described with respect to the receiver 62 and its detector means 87) to pivot the upper base plate 14 to a position in which the disk 44 is focused with the lens 71 and the mirror means 69 in the center of their vertical travel about parallel flexures 73. As the upper base plate 14 is pivoted, the lower base plate 16 is also pivoted in an opposite direction in order to maintain the parallel relationship between the upper base plate 14, the disk 44 and the lower base plate 16. Therefore, the disk 44 is positioned at the proper focal length from the upper base plate 14 and the lower base plate 16 to allow simultaneous reading of both sides thereof.

The optical readers 52-54 move radially with respect to the disk 44 along the guide rails 56 and 58, respectively, as indicated by arrows 106 and 108. Thus, as the disk 44 is rotated about the spindle 20 by the drive motor 18, the optical readers 52-54 scan the surface of each side of the disk 44.

Although not shown, it is to be understood that the cartridge 46 has window portions therethrough to allow the lens 70-71 to be actually positioned therewithin. Since the lens 70-71 are within the cartridge 46 during the scanning or reading of the disk 44, it is necessary to ensure they are fully removed therefrom before attempting to pull the cartridge 46 from the apparatus 10. Therefor, during an unloading sequence, the base plates 14 and 16 must be pivoted sufficiently to remove the lens 70-71 from the windows in the cartridge 46. In the case of the upper base plate 14, it has been found that an upward pivoting movement of 2 degrees relative to horizontal is sufficient to remove the lens 71. However, the lower base plate 16 must be downwardly pivoted at least 5 degrees relative to horizontal in order to completely disengage the spindle 20 as well as to remove the lens 70. The cartridge 46 may then be removed and the base plates 14-16 are positioned to begin another engagement sequence upon insertion of a new cartridge. As previously described above, the protrusion 23 prevents damage to the optical readers 52-54 if the disk 44 were to wobble excessively.

Referring to FIG. 8, a more detailed isometric view of the lead screws 30 and 32 is shown. In FIG. 8, it can be seen that the lead screws 30 and 32 are fixed by any appropriate method such as screws 122 to a portion of the frame 19 through brackets 82 and 84, respectively. Although the following discussion refers to the lead screw 32, the same description applies to the lead screw 30 with the appropriate reference number changes.

The lead screw 32 is driven by the stepper motor 39 which is powered by a source (not shown) through the power and control strap 15 (FIG. 1). As the stepper motor 39 turns the lead screw 32, the follower nut 36 travels therealong as indicated by an arrow 86. As the follower nut 36 travels along the lead screw 32, the yoke 42 which is pivotally attached to the nut 36 by pins 88 travels therewith. The yoke 42 is pivotally attached to the lower base plate 16 through a bracket 110 by pin and bearing means 90. The pin and bearing means 90 allows the yoke 42 to have limited two-dimensional movement thereabout needed to push or pull the lower base plate 16 in what is actually an arcuate path necessitated by the cooperating arrangement of parts. Thus, as the lead screw 32 is turned by the stepper motor 39, the follower nut 36 drives the yoke 42 which in turn causes the lower base plate 16 to move generally up and down as indicated by the arrow 78.

A pin 120 is fixed to the lower base plate 16 to protrude upwardly toward the base plate 14 as a cartridge lock. The different dimensions previously mentioned for the yokes 40 and 42 are more clearly shown in FIG. 8. The yoke 40 has a shorter connector 124 than a connector 126 on the yoke 42 due to the positioning of each lead screw 30-32 with reference to their respective base plates 14-16.

Referring to FIGS. 9A-C, 10A-C and 11A-C, the interrelationship between the base plates 14-16, the yokes 40-42 and the lead screws 30-32 is illustrated. Referring first to FIGS. 9A, 10A and 11A, the stepper motors 38 and 39 have each driven the lead screws 30-32 to place the follower nuts 34-36 at their extreme positions closest to the stepper motors 38 and 39.

In FIG. 9A, since the yoke 40 is attached at a first end 111 to the follower nut 34 and at a second end 113 to the upper base plate 14 by a bracket 109, as the first end 111 moves in a direction indicated by an arrow 91, the second end 113 moves generally in a direction as indicated by an arrow 93. Thus, the upper base plate 14 is positioned in its uppermost position in which a distance $G_1$ (defined as the distance from the storage case 12 to a bottom surface 124 of the upper base plate 14) has its greatest value.

Similarly, in FIG. 11A, the yoke 42 is attached at a first end 112 to the follower nut 36 and at a second end 114 to the lower base plate 16 by the bracket 110. As the first end 112 moves in a direction indicated by an arrow 92, the second end 114 moves generally in a direction as indicated by an arrow 94 (opposite the direction of arrow 93). Thus, the lower base plate 16 is positioned in its lowermost position in which a distance $H_1$ (defined as the distance from the storage case 12 to a bottom surface 65 of the lower base plate 16) has its smallest value. Therefore, in FIG. 10A, a distance $J_1$ (defined as the distance between the upper base plate 14 and the lower base plate 16) has its greatest value. The distance $J_1$ represents the spacing required between the plates 14 and 16 when loading and unloading the cartridge 46.

Referring to FIGS. 9B, 10B and 11B, the stepper motors 38 have turned the lead screws 30-32 to move the follower nuts 34-36 to their extreme positions distal the stepper motors 38 and 39. The yokes 40-42 are now in approximately vertical orientations.

In FIG. 9B, it can be seen that as the first end 111 of the yoke 40 travels in a direction as indicated by an arrow 95, the second end 113 of the yoke 40 moves generally in a direction as indicated by an arrow 97. Thus, the upper base plate 14 is positioned where a distance $G_2$ has its lowest value (i.e., $G_2$ is less than $G_1$).

In FIG. 11B, as the first end 112 of the yoke 42 travels in a direction as indicated by an arrow 96, the second end 114 of the yoke 42 moves generally in a direction as indicated by an arrow 98 (opposite the direction of arrow 97). Thus, the lower base plate 16 is positioned where a distance $H_2$ has its greatest value (i.e., $H_2$ is greater than $H_1$). Therefore, in FIG. 10B, a distance $J_2$ has its lowest value representing the positioning immediately after the initiation sequence as previously described above with the plates 14 and 16 parallel to each other.

Referring to FIGS. 9C, 10C and 11C, the stepper motors 38 and 39 have turned the lead screws 30-32 to drive the follower nuts 34-36 to intermediate positions along the lead screws 30-32. Thus, in FIG. 9C, the first end 111 of the yoke 40 moves in a direction indicated by an arrow 99 while the second end 113 moves generally in a direction indicated by an arrow 101. This causes the upper base plate 14 to move to a position where a distance $G_3$ is less than $G_1$ but greater than $G_2$.

Referring to FIG. 11C, the first end 112 of the yoke 42 moves in a direction indicated by arrow 100 while the second end 114 moves generally in a direction indicated by arrow 102 (opposite the direction of arrow 101). This causes the lower base plate 16 to move to a position where the distance $H_3$ is less than the distance $H_2$ but greater than the distance $H_1$. Thus, in FIG. 10C, $J_2$ representing one possible operating position. Thus, a distance $J_3$ has a value less than $J_1$, but greater than the upper plate 14, the lower plate 16 and the optical disk 44 are all parallel to each other for simultaneous reading of both sides of the disk 44.

As indicated by the dashed line 103 passing through a pin and bearing means 126 associated with upper base plate 14 and the dashed line 104 through the pin and bearing means 90 associated with the lower plate 16 in each of FIGS. 9A-C and 11A—C, it can be seen that the pins 126 and 90 are always in the same vertical axis. Thus, as the yokes 40-42 are moved by the follower nuts 34-36, the base plates 14 and 16 must pivot in opposite directions about the hinges 22-24 and 26-28, respectively. When the base plates 14-16 are in positions in which the distance from the storage case 12 is equal to $G_1$ and $H_1$, the base plates 14-16 are in position for loading or unloading the cartridge 46.

As the cartridge 46 is inserted into the apparatus 10, the stepper motors 38-39 drive the follower nuts 34-36 to the positions indicated in FIGS. 9B and 11B in which the distances between the base plates 14-16 and the storage case 12 are equal to $G_2$ and $H_2$. In this closest position, the optics associated with the upper base plate 14 can then determine whether the optical storage disk 44 is in focus and make appropriate adjustments as required.

In FIGS. 9C, 10C and 11C, for example, appropriate adjustments have been made, positioning the upper base plate 14 at the proper distance from the optical storage disk 44 to place the optics in focus. Since the lower base plate 16 was already in focus at a fixed distance from and parallel to the optical storage disk 44, the apparatus 10 may now read both sides of optical storage disks that vary in thickness, thus cutting information transfer time in half compared with a device that reads only one side at a time.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. An apparatus for reading both sides of a disk, comprising:
   first and second focusing means, each said means having a focusing range; and
   means for positioning the disk between said first and second focusing means wherein said first and second focusing means are focused on a different side of the disk and substantially in a center of said focusing ranges, said means for positioning including:
   first plate means for positioning the disk at a fixed distance therefrom,
   first lead screw means for pivotally moving said first plate means,
   second plate means arranged to pivot relative to said first plate means while a distance therebetween is able to vary, the disk being positioned between said first and second plate means, and
   second lead screw means for pivotally moving said second plate means.

2. The apparatus of claim 1 wherein said first and second focusing means each comprises:
   at lest one flexure attached to an optical mirror means; and
   an electric coil encircling said flexure to cause said flexure to be magnetically attracted thereto so that a lens attached to said mirror means moves closer to or farther from the disk through said focusing range.

3. The apparatus of claim 1, wherein said first and second lead screw means each comprises:
   a lead screw;
   a follower nut for travelling along said lead screw;
   a stepper motor for turning said lead screw; and
   a yoke for interconnecting said plate means to said follower nut wherein as said stepper motor turns said lead screw, said follower nut travels therealong and said yoke pivotally moves said plate means.

4. The apparatus of claim 1, wherein said first and second lead screw means are controlled through separate stepper motors.

5. The apparatus of claim 1, further comprising a storage case for housing said first and second plate means and said first and second lead screw means.

6. The apparatus of claim 1, wherein said first and second plate means each comprises:
- a generally flat plate having first and second oppositely facing edges;
- a pair of hinges along aid first edge of said plate; and
- a bracket along said second edge of said plate for interconnection to one of said first and second lead screw means.

7. An apparatus for positioning a disk to read from both sides of the disk, comprising:
- first and second optical readers, said readers positioned about opposite sides of the disk;
- first positioning means attached to said first reader, said first positioning means for placing the disk parallel to and a predetermined distance from a portion of aid first positioning means; and
- second positioning means attached to said second reader, said second positioning means for moving the disk with said first positioning means to place the disk parallel to and a focal distance from a portion of said second positioning means, wherein said second reader is moved automatically in a direction substantially perpendicular to the plane of the disk, so that said first and second readers are focused on the disk for reading of both sides thereof.

8. The apparatus of claim 7, wherein each of said first and second positioning means comprises a hinged plate.

9. The apparatus of claim 8, wherein each of said first and second positioning means further includes:
- a stepper motor;
- a lead screw driven by said motor;
- a follower nut for travelling along said lead screw due to rotational movement of said lead screw; and
- a yoke connecting said follower nut and said plate, wherein as said follower nut moves along said lead screw, said plate is pivoted about hinges.

10. The apparatus of claim 7, wherein each of said first and second optical readers comprises:
- a pair of flexures, said flexures being parallel to each other;
- an electric coil surrounding said flexures;
- mirror means fixed to said flexures opposite said coil; and
- a fixed focal length lens attached to said mirror means.

11. A method for positioning a disk to read from both sides of the disk, comprising the steps of:
- placing the disk between first and second focusing means, each said focusing means having a focusing range;
- locating the disk substantially parallel to and a predetermined distance from a portion of a first pivoting plate which includes said first focusing means attached thereto, said predetermined distance being equal to a focal length of said first focusing means in substantially a center of said focusing range;
- positioning a portion of a second pivoting plate which includes said second focusing means attached thereto so that it is substantially parallel to the disk and said first plate portion;
- pivoting said first plate;
- pivoting said second plate wherein the disk is positioned a distance substantially equal to a focal length of said second focusing means in said center of said focusing range so that both sides of the disk can be read.

12. The method of claim 11, wherein the step of placing comprises securing a cartridge containing the disk to a case enclosing said first and second plates to hold said cartridge from movement while the disk moves with said first plate.

13. A method for reading both sides of an optical storage disk, comprising the steps of:
- placing the disk between first and second focusing means, each said focusing means having a focusing range;
- placing the disk parallel to and a fixed distance from a portion of a first pivoting plate which includes said first focusing means attached thereto, said fixed distance being substantially equal to a focal length of said first focusing means in substantially a center of said focusing range;
- positioning a portion of a second pivoting plate which includes said second focusing means attached thereto a predetermined distance from said first plate;
- turning first and second lead screws with stepper motors to drive follower nuts along said lead screws;
- interconnecting said follower nuts and said pivoting plates with yokes, wherein as said follower nuts drive along said lead screws, said pivoting plates are pivotally moved by said yokes; and
- pivoting said second plate with said second lead screw means wherein the disk is positioned at a distance equal to a focal length of said second focusing means in substantially a center of said focusing range for reading of both sides of the disk.

14. A method for reading both sides of an optical storage disk, comprising the steps of:
- inserting a cartridge containing the disk into position fixing means between a first fixed focal length optical reader and a second fixed focal length optical reader;
- positioning said first optical reader at a fixed distance from a first side of the disk;
- positioning said second optical reader at a distance from a second side of the disk; and
- adjusting automatically said first and second optical readers until said second optical reader is at a proper focal distance from said second side of the disk by moving said second optical reader in a direction substantially perpendicular to the plane of the disk, wherein said first and second optical readers may read said first and second sides of the disk.

15. The method of claim 14, wherein the step of positioning a first optical reader comprises the step of:
- pivotally moving a first plate about a hinge, said plate including a drive spindle and said first optical reader attached thereto, in order to place said spindle in contact with the disk, wherein said spindle fixes the disk said fixed distance from said first optical reader and said first plate.

16. The method of claim 15, wherein the step of pivotally moving said first plate comprises the steps of:
- turning a lead screw with a stepper motor responsive to a focusing signal from said first optical reader;
- causing a follower nut to move along said lead screw; and
- interconnecting said follower nut to said first plate with a yoke, wherein said follower nut pivotally moves said plate through interconnection with said yoke.

17. The method of claim 14, wherein the step of positioning a second optical reader comprises the step of:
pivotally moving a second plate about a hinge, said second plate including said second optical reader attached thereto.

18. The method of claim 17, wherein the step of pivotally moving said second plate comprises:
turning a lead screw with a stepper motor responsive to a focusing signal from said second optical reader;
causing a follower nut to move along said lead screw; and
interconnecting said follower nut to said second plate with a yoke, wherein said follower nut pivotally moves said plate through interconnection with said yoke.

19. A method for automatically adjusting the position of at least one optical focus assembly of an optical reader device relative to a second disk having a thickness different from a first disk, after the first disk is removed and the second disk is inserted by the user of the optical reader device, comprising:
providing a first disk including first and second sides and having a first thickness;
providing a second disk including first and second sides and having a second thickness;
providing a first optical assembly for reading information from said first side of said first disk and being connected to a first support means adapted for movement;
providing a second optical assembly for reading information from said second side of said first disk and being connected to a second support means adapted for movement;
inserting by the user said first disk into the optical reader device;
reading information from one of said first and second sides of said first disk using one of said first optical assembly and said second optical assembly, respectively;
removing by the user said first disk from the optical reader device;
inserting by the user said second disk into the optical reader device;
obtaining information relating to focusing of said second optical assembly relative to said second side of said second disk; and
adjusting automatically said second optical assembly relative to aid second side of said second disk by moving said second optical assembly in a direction substantially perpendicular to the plane of said second disk when it is determined that a predetermined focus arrangement does not exist between said second optical assembly and said second side of said second disk.

20. The method of claim 19, wherein the step of adjusting includes:
moving automatically said second optical assembly in one of a direction substantially towards and away from the plane of said second disk until said second optical assembly is positioned so that said second optical assembly is substantially at the center of its focusing range.

21. The method of claim 19, wherein the step of reading information includes:
reading simultaneously information from each of said first and second sides of said first disk using said first and second optical assemblies, respectively.

22. The method of claim 19, wherein the step of adjusting further includes:
moving said first optical assembly together with said second disk to maintain said second disk substantially parallel to a portion of said second support means.

23. The method of claim 19, wherein the step of adjusting includes:
pivoting said second optical assembly.

24. An apparatus in which an optical assembly thereof is automatically adjusted relative to a disk to provide a desired focus, comprising:
first optical means for reading information from a first side of a disk positioned in an optical reader device;
second optical means for reading information from a second side of the disk;
first support means connected to said first optical means and adapted for movement;
second support means connected to said second optical means and adapted for movement;
wherein one of said first and second optical means receives information from the disk for determining information relating to whether said second optical means is at a predetermined position in a direction substantially perpendicular to the plane of the disk, said predetermined position relating to focusing of a light beam on said second side of the disk; and
first moving means for automatically moving said second support means and said second optical means relative to the disk in a direction substantially perpendicular to the plane of the disk while the disk is in the optical reader device, wherein said second optical means is moved to said predetermined position.

25. The apparatus of claim 24, further including:
second moving means for automatically moving said first support means together with said first optical means.

26. The apparatus of claim 25, wherein:
said second moving means is operatively connected to the disk, wherein the disk moves with said first optical means.

* * * * *